United States Patent
Buddhikot et al.

(10) Patent No.: US 8,532,023 B2
(45) Date of Patent: Sep. 10, 2013

(54) INTERFERENCE AWARE ROUTING IN MULTI-RADIO WIRELESS MESH NETWORKS

(75) Inventors: Milind M. Buddhikot, Manalapan, NJ (US); Scott C. Miller, Freehold, NJ (US); Anand Prabhu Subramanian, Stony Brook, NY (US)

(73) Assignee: Alcatel Lucent, Paris (FR)

( * ) Notice: Subject to any disclaimer, the term of this patent is extended or adjusted under 35 U.S.C. 154(b) by 1465 days.

(21) Appl. No.: 11/772,140

(22) Filed: Jun. 30, 2007

(65) Prior Publication Data
US 2008/0069034 A1 Mar. 20, 2008

Related U.S. Application Data

(60) Provisional application No. 60/845,868, filed on Sep. 20, 2006.

(51) Int. Cl.
*H04W 4/00* (2009.01)

(52) U.S. Cl.
USPC ........ 370/328; 370/329; 455/422.1; 455/460; 455/524; 455/525

(58) Field of Classification Search
USPC ........................................................ 370/328
See application file for complete search history.

(56) References Cited

U.S. PATENT DOCUMENTS

2005/0286426 A1* 12/2005 Padhye et al. ................. 370/238

OTHER PUBLICATIONS

D.S.J. Couto, D. Aguayo, J. Bicket, and R. Morris. A High-Throughput Path Metric for Multi-Hop Wireless Routing. In MOBICOM, 2003.
R. Draves, J. Padhye, and B. Zill. Routing in Multi-Radio, Multi-Hop Wireless Mesh Networks. In MOBICOM, 2004.
K. Jain, J. Padhye, V. N. Padmanabhan, and L. Qiu. Impact of Interference on Multi-hop Wireless Network Performance. In MOBICOM, 2003.
A. Kashyap, S. Ganguly, and S.R. Das. Characterizing Interference in 802.11-based Wireless Mesh Networks . Technical report, Department of Computer Science, Stony Brook University, 2006.
S. Liese, D. Wu, and P. Mohapatra. Experimental Characterization of an 802.11b Wireless Mesh Network. Technical report, Department of Computer Science, UC Davis, 2005.
J. Padhye, S. Agarwal, V.N. Padmanaban, L. Qiu, A. Rao, and B. Zill. Estimation of link interference in static multi-hop wireless networks. In (IMC), 2005.
J.L. Sobrinho. Network Routing with Path Vector Protocols: Theory and Applications. In ACM SIGCOMM, pp. 49-60, 2003.
Y. Yang, J. Wang, and R. Kravets. Designing Routing Metrics for Mesh Networks. In WiMesh, 2005.

* cited by examiner

*Primary Examiner* — Lester Kincaid
*Assistant Examiner* — Diego Herrera
(74) *Attorney, Agent, or Firm* — Wall & Tong, LLP

(57) ABSTRACT

A method and system using inter-node interference data to improve the routing of data within a wireless mesh network.

21 Claims, 6 Drawing Sheets

100

200

LOGICAL TOPOLOGY

300

CHANNEL ASSIGNMENT

400

INTERFERENCE AWARE ROUTING IN MULTI-RADIO WIRELESS MESH NETWORKS

CROSS-REFERENCE TO RELATED APPLICATIONS

This application claims benefit of U.S. provisional patent application Ser. No. 60/845,868, filed on Sep. 20, 2006, which is incorporated herein by reference in its entirety and to which application we claim priority under 35 U.S.C. §119.

FIELD OF THE INVENTION

The invention relates generally to wireless networking and, more particularly, to the routing of information within a wireless mesh network.

BACKGROUND OF THE INVENTION

Given a source and destination node, a routing protocol provides one or more network paths over which packets can be routed to the destination. The routing protocol computes such paths to meet criteria such as minimum delay, maximum data rate, minimum path length and so on. A routing metric that accurately captures quality of network links and thus aids in meeting such criteria is central to computation of good quality paths. The design of routing metrics for wireless multi-hop networks is challenging due to the following three unique characteristics of wireless links.

Time varying channels and resulting variable packet loss. The wireless links suffer from short term and long term fading and result in varying packet loss over different time scales. When the distance between the communicating nodes is large or if environment is obstacle rich and causes fading, the loss ratio of the link can be high. A routing metric should accurately capture this time varying packet loss.

Packet transmission rate. The packet transmission rate (or data rate) may vary depending upon the underlying physical layer technology. For example, 802.11a links have high data rate compared to 802.11b links. The data rate may also vary depending on the link loss characteristics when auto-rate control algorithms are used.

Interference. Wireless links operating in unlicensed spectrum suffer from two kinds of interference; namely uncontrolled interference and controlled interference. Uncontrolled interference results from non-cooperating entities external to the network that use the same frequency band but do not participate in the Media Access Control (MAC) protocol used by network nodes (e.g., microwave ovens and Bluetooth devices operating in 2.4 GHz ISM bands interfere with 802.11b/g networks in the same band). Controlled interference results from broadcast nature of wireless links where a transmission in one link in the network interferes with the transmissions in neighboring links. The interference of this kind depends on factors such as the topology of the network, traffic on neighboring links etc.

SUMMARY

The invention addressed various deficiencies in the prior art by providing methodologies for more accurately characterizing mesh network link quality to, for example, enable the selection of an appropriate data transmission path. In one embodiment, each node within the wireless mesh network determines or otherwise receives an indication of the steady state or "long-term" quality parameter associated with links to surrounding nodes. An interference ratio is determined for each of the surrounding node links. The interference ratio is used to adapt or scale the steady state or "long-term" quality parameter to derive for each link a more accurate quality parameter. This improved quality parameter information is used within the context of a routing protocol to determine a data transmission path. Also disclosed is an enhanced version of the Ad-hoc On-demand Distance Vector (AODV) routing protocol called AODV-Multi-Radio (AODV-MR). Unlike the original AODV, AODV-MR works for complex networks with mesh or ad hoc nodes with multiple radio interfaces that operate using multiple channels.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention will be described within the context of a wireless mesh network having fixed nodes, mobile nodes, or a combination of fixed and mobile nodes. For example, a network benefiting from the present invention may include network nodes mounted upon emergency service vehicles such that an emergency services network is rapidly deployed along with first responder vehicles such as police, fire and ambulance vehicles. Nodes within a wireless mesh network operate as wireless routers to forward received a data towards the destination nodes associated with a data. Of particular interest within a wireless mesh network having constantly moving nodes is the changes in node to node interference levels associated with that movement. The present invention adapts link quality assessment technology in response to inter-node interference levels to enable thereby more accurate routing of data.

In one embodiment, each node within the wireless mesh network determines or otherwise receives an indication of the steady state or "long-term" quality parameter associated with links to surrounding nodes. An interference ratio is determined for each of the surrounding node links. The interference ratio is used to adapt or scale the steady state or "long-term" quality parameter to derive for each link a more accurate quality parameter. This improved quality parameter information is used within the context of a routing protocol to determine a data transmission path.

Figure 1:
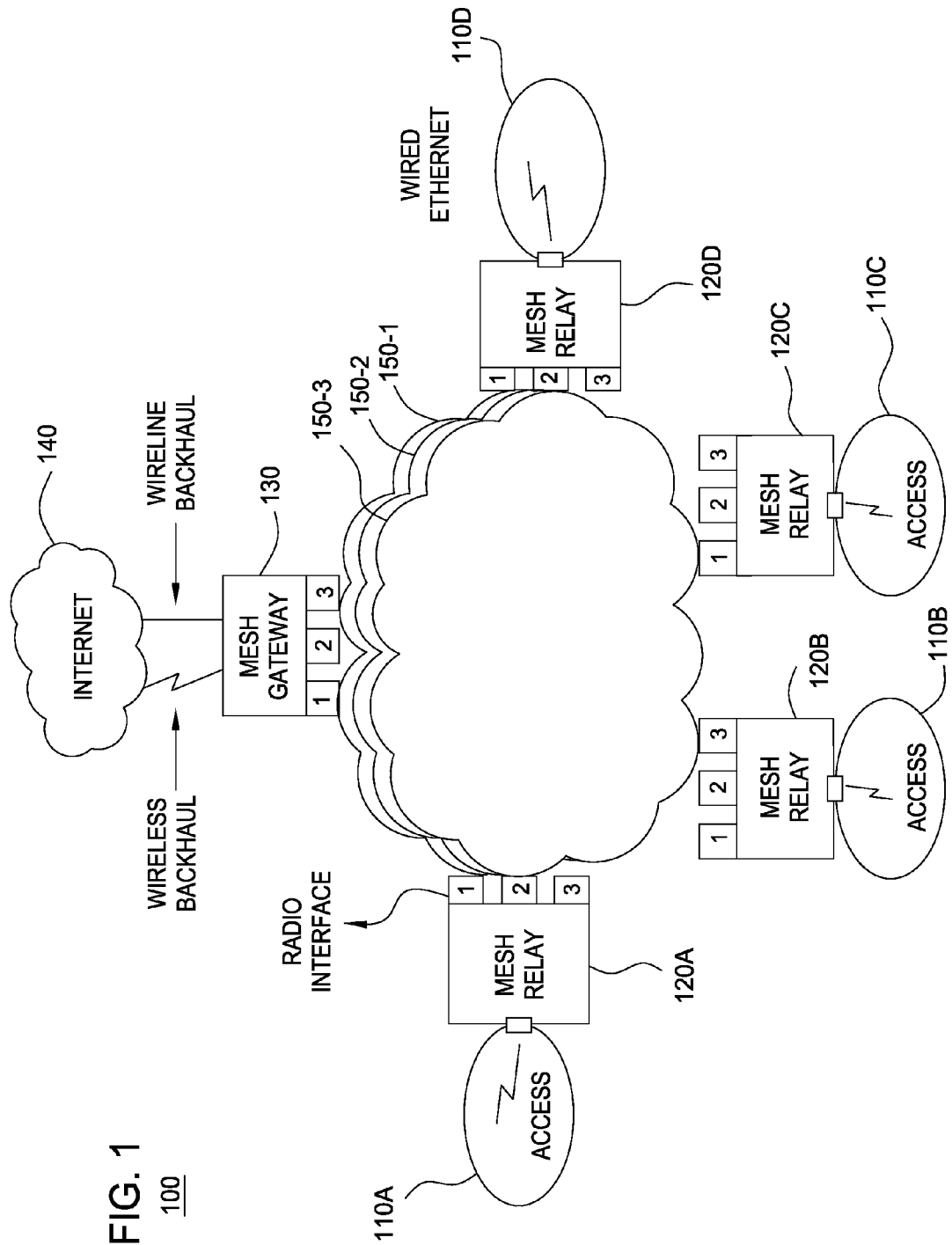
FIG. 1 depicts a high-level block diagram of a multi-radio mesh network architecture suitable for use within the context of the present invention.

FIG. 1 depicts a high-level block diagram of a multi-radio mesh network architecture suitable for use within the context of the present invention. Specifically, each a plurality of access networks 110A, 110B and 110C (collectively access networks 110) is coupled to a respective mesh relay 120. The mesh relays are adapted to communicate with each other via any one of, illustratively, three radio frequencies. The three radio frequencies correspond to the respective frequencies of first network cloud 150-1, second network cloud 150-2 and third network cloud 150-3. Thus, each of the mesh relays 120 includes a necessary circuitry to receive and transmit data using any of the network clouds. A mesh gate way 130 is coupled to the Internet 140 and two each of the three network clouds 150 to provide Internet access and thereby. The mesh Gateway 130 is depicted as being coupled to the Internet 140 via a wireline backhaul connection as well as a wireless backhaul connection.

Each of the network clouds 150 comprises a plurality of network elements (not shown). These network elements operate to route data from a data transmitting network element to a data receiving network element. The data transmitting and receiving network elements may be within any of the access networks 110, any of the network clouds 150 or beyond the mesh Gateway 130 such as a remote transmitting or receiving network element accessible via the Internet 140.

Generally speaking, the present invention operates to more accurately characterize mesh network link quality to, for example, enable the selection of an appropriate data transmission path. In one embodiment, each node within the wireless mesh network determines or otherwise receives an indication of the steady state or "long-term" quality parameter associated with links to surrounding nodes. An interference ratio is determined for each of the surrounding node links. The interference ratio is used to adapt or scale the steady state or "long-term" quality parameter to derive for each link a more accurate quality parameter. This improved quality parameter information is used within the context of a routing protocol to determine a data transmission path.

Hop count is the traditional routing metric used in most of the common routing protocols designed for multi-hop wireless networks. This metric treats all links in the network to be alike and finds paths with the shortest number of hops. It also does not account for data rate and interference experienced by the links. This can often result in paths which have high loss ratio and therefore, poor performance.

Expected Transmission Count (ETX) is a technique that characterizes the link loss ratio using the expected number of Media Access Control (MAC) retransmissions needed to successfully deliver a packet from the sender to the receiver. The lower the ETX metric for a link, the better is the link. The path metric is the summation of ETX of each link in the path.

The ETX of a link is the predicted number of data transmissions required to send a packet over that link, including retransmissions. The ETX of a route is the sum of the ETX for each link in the route. For example, the ETX of a three-hop route with perfect links is three; the ETX of a one-hop route with a 50% delivery ratio is two. The ETX of a link is calculated using the forward and reverse delivery ratios of the link. The forward delivery ratio, d_f, is the measured probability that a data packet successfully arrives at the recipient; the reverse delivery ratio, d_r, is the probability that the ACK packet is successfully received.

These delivery ratios can be measured as described below. The expected probability that a transmission is successfully received and acknowledged is d_f×d_r. A sender will retransmit a packet that is not successfully acknowledged. Because each attempt to transmit a packet can be considered a Bernoulli trial, the expected number of transmissions is defined as:

$$ETX = 1/(d\_f * d\_r)$$

ETX does not consider the data rate at which the packets are transmitted over each link. Since ETX is measured using periodic broadcast packets which are sent at a very slow interval (usually 1 sec), they do not reflect how busy a link is. ETX might vary when there is very high load due to 802.11 MAC unfairness or when there is loss of the broadcast packets due to collision with packets from hidden terminals. However, when the sender of the ETX broadcast packet can hear (or sense) the neighboring transmissions, collision does not happen and ETX is not affected. Thus, ETX does not capture the interference experienced by the links completely. ETX was designed for networks using a single channel, so it cannot exploit the presence of multiple channels and find paths that have better channel diversity.

Weighted Cumulative Expected Transmission Time (ETT) for multi-radio multi-channel mesh networks is a technique the improves upon ETX by capturing the data rate used by each link. The $ETT_i$ of a link i is defined in equation 1 as follows:

$$ETT_i = ETX_i \times \frac{S}{B_i} \qquad (\text{eq. 1})$$

where S is the packet size used and $B_i$ is the raw data rate (bandwidth) of the link i. ETXi characterizes the expected MAC transmission time of a packet of size S over the link i. Both ETX and ETT do not consider the presence of multiple channels and therefore, find paths with less channel diversity. Also, ETT characterizes the expected transmission time in the absence of interference in the network.

Weighted Cumulative Expected Transmission Time (WCETT) is a path metric used to characterize quality of an entire multi-hop path between nodes wherein the path contains multiple links. WCETT can be used in the context of single radio, single channel as well as multi-radio multi-channel mesh networks and is adapted to find paths with less intra-flow interference. The WCETT metric of a path is defined according to equation 2 as follows:

$$WCETT_p = (1-\alpha) \times \sum_{i \in p} ETT_i + \alpha \times \max_{1 \le j \le k} X_j \qquad (\text{eq. 2})$$

where $X_j$ is the summation of ETT of the links in path p operating on channel j, k is the number of orthogonal channels available and $0 \le \alpha \le 1$ is a tunable parameter. The first component in the WCETT metric helps in finding path with links having less ETT. The second component improves the channel diversity and helps in finding paths with less intra-flow interference.

One limitation of the WCETT metric is that it does not capture inter-flow interference and when there are multiple flows in the network, it might end up finding routes in more congested areas of the network which results in poor throughput.

Figure 2:
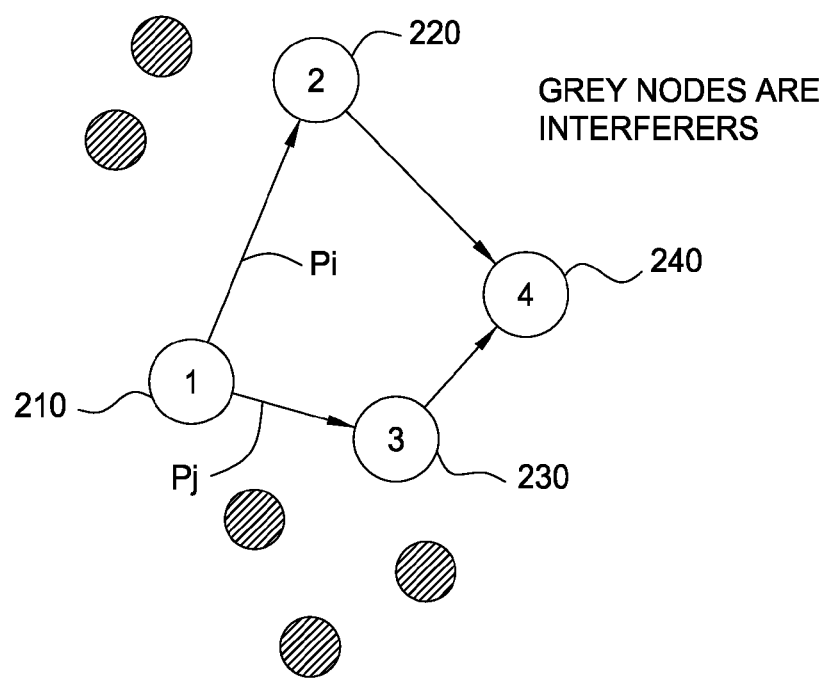
FIG. 2 depicts a graphical representation of network elements useful in understanding the present invention.

FIG. 2 depicts a graphical representation of network elements useful in understanding the present invention. Specifically, FIG. 2 depicts a first network element 210 coupled to a second network element 220 via a path Pi. The first network element to 10 is also coupled to a third network element 230 via a path Pj. A fourth network element 240 is coupled between the second 220 and third 230 network elements. To interfering network elements are depicted as being near path Pi, while three interfering network elements are depicted as being near path Pj.

Data being transmitted between first network element 210 and second network element 220 may follow the direct path 1-2 (i.e., path Pi) or the indirect path 1-3-4-2. Either path may be appropriate, depending upon the amount of interference associated with each path and, generally, the quality degradation associated with each path. For example, if the quality degradation of the direct path 1-2 is greater than the sum of the quality degradation for paths 1-3, 3-4 and 4-2, then the indirect path 1-3-4-2 is better. It may be insufficient to know the total or maximum number of interferes around the links in the network paths without knowing the amount of interference they cause. As an example, in FIG. 2, a direct link 1-2 between nodes 1 and 2 has only two interferers nearby unlike link 1-3 in the indirect path 1-3-4-2 which has three. If link 1-2 is favored without accounting for the actual interference caused by the smaller number of interferes, then a poor quality path will be selected. iAware addresses these choices and provides interference (traffic) awareness.

1. Interference Aware Routing Metric (iAWARE).

To assist in routing (or for other link and/or path characterization purposes), the inventors have devised a new routing model or metric iAWARE, which addresses the various limitations of existing routing metrics. This routing metric captures the effects of variation in link loss-ratio, differences in transmission rate as well as inter-flow and intra-flow interference. When there is no interference in the network, ETT captures the quality of the link quite well as links with less expected transmission time give better throughput. However, when there are more interfering flows in the network, this is not the case. The varying interference experienced by a link is factored into the routing metric to find good quality paths.

Interference is modeled and factored into the iAWARE metric. A protocol interference model, physical interference model or other model may be used. For this example, the physical interference model is used to capture the interference experienced by links in the network. In this model, a communication between nodes u and v is successful if the SINR (Signal to Interference and Noise Ratio) at the receiver v is above a certain threshold which depends on the desired transmission characteristics (e.g., channel, data rate and the like). Specifically, the signal strength of a packet from node u at node v is denoted by the term $P_v(U)$, and a packet on the link (u,v) is correctly received if and only if equation 3 is satisfied, as follows.

$$\frac{P_v(u)}{N + \sum_{w \in V'} P_v(w)} \geq \beta, \qquad (eq. 3)$$

Where N is the background noise, V' is the set of nodes simultaneously transmitting and β is a constant which depends on the data rate, channel characteristics, modulation scheme and the like. Considering a DATA/ACK like transmission on a link, the SINR values at both the nodes u and v are likely greater than β.

This model is less restrictive compared to the protocol interference model since only depends on the signal strength values which can be measured easily using commodity wireless cards. It is also not restrictive to any medium access mechanism (802.11, CSMA/CA, TDMA).

The inventors have defined a term interference ratio $IR_i(u)$ for a node u in a link i=(u,v) where $(0 < IR_i(u) \leq 1)$ as follows in equation 4.

$$IR_i(u) = \frac{SINR_i(u)}{SNR_i(u)} \qquad (eq. 4)$$

where:

$$SNR_i(u) = \frac{P_u(v)}{N} \qquad (eq. 5)$$

$$SINR_i(u) = \frac{P_u(v)}{N + \sum_{w \in \eta(u) - v} \tau(w) P_u(w)} \qquad (eq. 6)$$

Where η(μ) denotes the set of nodes from which node u can hear (or sense) a packet and τ(ω) is the normalized rate at which node w generates traffic averaged over a period of time. τ(ω) is 1 when node ω sends out packets at the full data rate supported, and is used to weight the signal strength from an interfering node ω since τ(ω) gives the fraction of time node ω occupies the channel.

Considering a bidirectional communication link i=(u,v) for a DATA/ACK like communication, $IR_i$ is defined as follows in equation 7.

$$IR_i = \min(IR_i(u), IR_i(v)) \qquad (eq. 7)$$

When a link experiences no interference (e.g., no interfering neighbors or no traffic generated by interfering neighbors) the SINR of a link i is equal to the SNR and this $IR_i$ is equal to 1. In this case, the link i is independent of interference and the quality of the link is determined by the link loss-ratio and the data rate at which it operates captured by a long term quality metric such as $ETT_i$ or $ETX_i$.

The inventors define a new link metric iAWARE of a link i as follows in equation 8. It is noted that equation 8 depicts iAWAREj as a function of the quality metric $ETT_j$ and represents only one exemplary way. In other embodiments of the invention $iAWARE_j$ is a function of other quality metrics, such as $ETX_j$ and, illustratively, other functions of IRj.

$$iWARE_j = \frac{ETTj}{IR_j} \qquad (eq. 8)$$

When $IR_j$ for the link j is 1 (no interference), $iAWARE_j$ is equal to $ETT_j$, which captures the link loss ratio and packet transmission rate of the link j. $ETT_j$ is weighted or adapted with $IR_j$ to capture the interference experienced by the link from its neighbors. A link with low ETT and high IR will have a low iAWARE value. Given this type of adapting (i.e., scaling), the lower the iAWARE value associated with a link, the better the link quality. The iAWARE approach described herein advantageously finds paths with better quality when there are multiple interfering flows in the network.

In order to exploit the channel diversity and to find paths with less intra-flow interference, the inventors define a parameter $X_j$ as follows in equation 9.

$$X_j = \sum_{\text{conflicting links } i \text{ on channel } j} iAWARE_i, \; 1 \leq j \leq k \qquad (eq. 9)$$

Where k is the number of orthogonal channels available and it is deemed that link $e_1=(u,v)$ conflicts with link $e_2=(x,y)$ if any one of the following inequalities is true:

$$\frac{P_u(v)}{N + \sum_{w \in \{x,y\}} P_u(w)} < \beta, \quad \frac{P_v(u)}{N + \sum_{w \in \{x,y\}} P_v(w)} < \beta$$

$$\frac{P_x(y)}{N + \sum_{w \in \{u,v\}} P_x(w)} < \beta, \quad \frac{P_y(x)}{N + \sum_{w \in \{u,v\}} P_y(w)} < \beta$$

The weighted cumulative path metric iAWARE(p) of a path p is non-isotonic and is defined as follows in equation 10.

$$iAWARE(p) = (1 - \alpha) \times \sum_{i=1}^{n} iAWARE_i + \alpha \times \max_{1 \leq j \leq k} X_j \quad \text{(eq. 10)}$$

It is noted that the path metric iAWARE(j) is non-isotonic like WCETT because of the second component.

2. Advanced On-Demand Distance Vector Multi-Radio (AODV-MR) Routing Protocol.

Figure 3B:
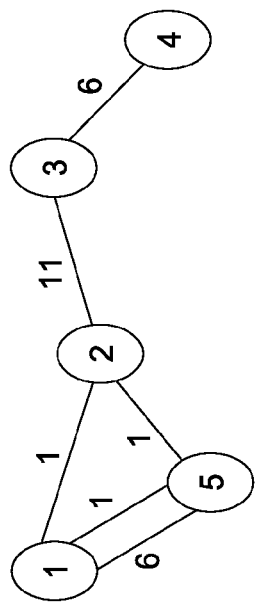
FIG. 3 depicts a graphical representation channel assignments and logical topology of multi-radio nodes in a wireless mesh network.
Figure 3A:
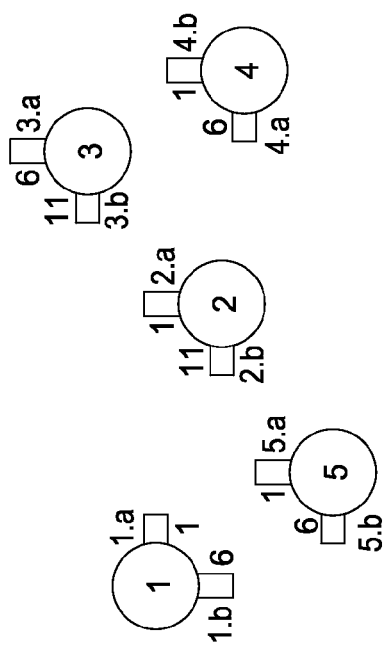
Figure 4:
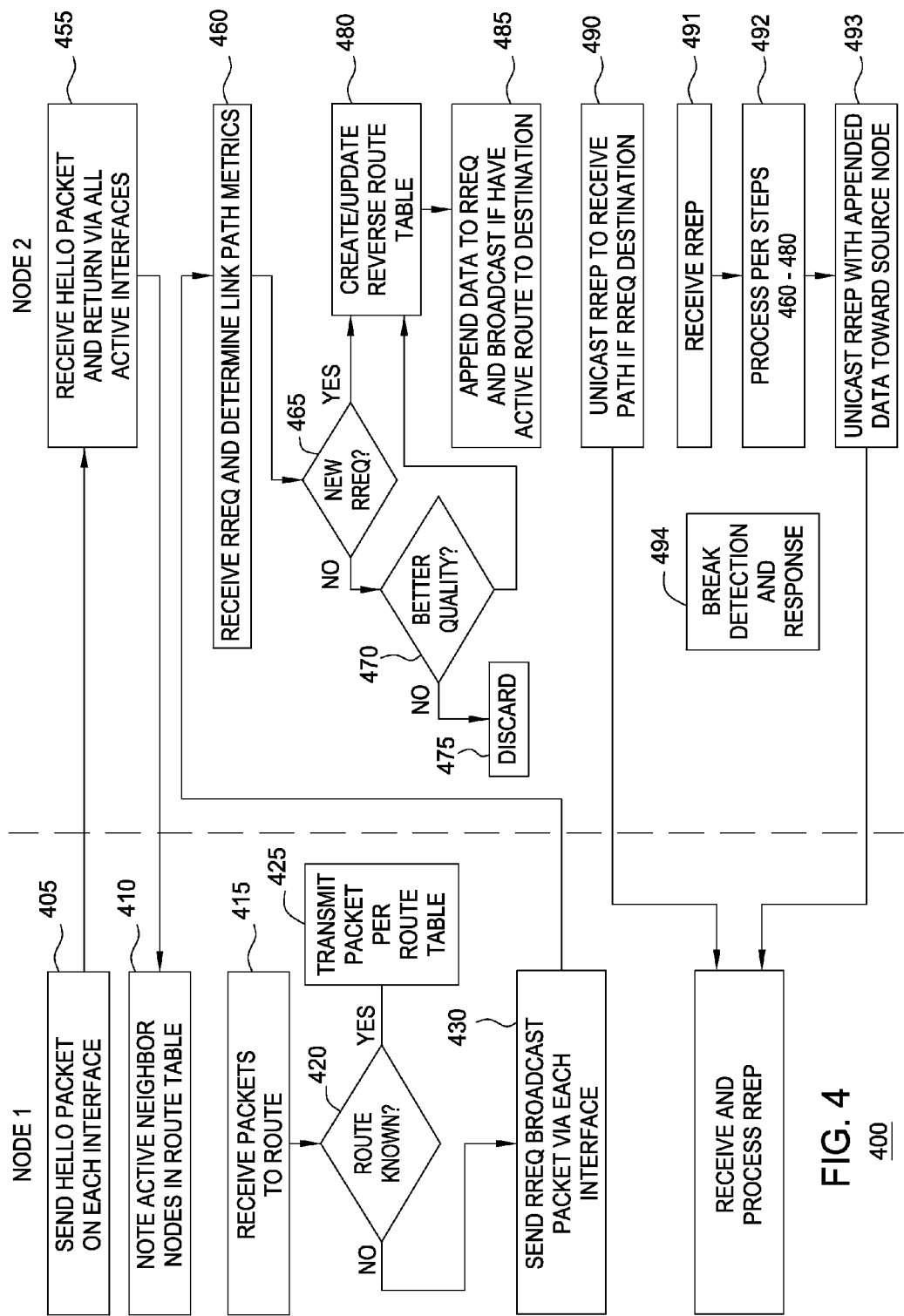
FIG. 4 depicts a flow diagram of a method for discovery and packet routing within a wireless mesh network.

The inventors provide a multi-radio on-demand distance vector routing protocol that incorporates the new metric iAWARE to find efficient paths. The operation of this routing protocol will be discussed with respect to FIG. 3 and FIG. 4. FIG. 3 depicts a graphical representation channel assignments and logical topology of multi-radio nodes in a wireless mesh network. FIG. 4 depicts a flow diagram of a method for discovery and packet routing within a wireless mesh network.

Specifically, FIG. 3 depicts five nodes denoted as nodes 1-5. Nodes 1, 2 and 5 communicate directly with each other, node 2 also communicates directly with node 3, and node 3 also communicates directly with node 4. Each of the nodes comprises a wireless router having multiple radio/wireless interfaces (denoted as, for example, 1.a and 1.b for node 1, 2.a and 2.b for node 2 and so on). Each interface may communicate on multiple radio frequencies. Each wireless interface is tuned to a different channel using efficient channel assignment algorithms. The channel assignment to the wireless interfaces gives a logical topology on which the routing protocol operates. Nodes 1 and 5 communicate directly via two wireless channels, whereas other node to node communications are supported by single wireless channels. The routing protocol decides which link to use depending upon the link metric, which might be different depending upon the degree of interference experienced in the channels within which the links are operating.

Referring also now to FIG. 4, a node begins a node discovery process by periodically transmitting (step 405) HELLO broadcast packets on each of its interfaces to discover its neighboring nodes. Upon receiving a HELLO packet (step 455), the node transmits the HELLO packet back to the sender along with identification and characterizing information to enable node to node discovery (e.g., neighbor node discovery). The sending node updates its route table (step 410) to include any newly discovered nodes. In one embodiment, each interface in a node is assigned a unique IP address so that when nodes send HELLO packets they actually discover neighboring interfaces tuned to the same channel. This establishes multiple links between neighboring nodes if they have more than one interface tuned to a common channel. The HELLO broadcast packets are optionally used to compute ETX, ETT and IR parameters.

A node (e.g., node 1) begins a route discovery process when it receives (step 415) a packet to send to a destination node. If the route to the destination node is known (step 420) then the packet is transmitted toward the destination node per the route table associated with the transmitting node (or a remote/managed route table). If the route to the destination node is not known, then the node sends (step 430) a Route Request (RREQ) broadcast packet or message via each of its interfaces on the different channels to which they are tuned.

Each RREQ packet sent has a unique identifier which is a combination of the IP address of the interface from which it is sent and a RREQ sequence number which is incremented for each RREQ packet generated. This identifier is used to discard duplicate RREQ packets received from other nodes and to prevent routing loops.

To compute the path metric when the RREQ traverses the network, the link metric (iAWARE) for each link traversed and the operating channel is determined. This is accomplished by overloading the RREQ packet to carry the link metric and the channel of each link traversed.

When an intermediate node (e.g., node 2) receives (step 460) an RREQ packet it determines the link path metric(s) associated with the receiving path. The receiving node then checks (step 465) the unique identifier to determine if it has already received the particular RREQ.

If the RREQ has been previously received, but is not associated with a better quality path (step 470), the RREQ is discarded (step 475).

If the RREQ has not been previously received, then the node creates (step 480) a reverse route entry to the originator (source) of the RREQ packet. If it had already seen the RREQ packet but received the new one on a better quality path (based for example on a path metric computed using any of the above equations), the reverse route entry is updated accordingly. The method then appends the link information (e.g., iAWARE and channel identifier) in the RREQ message and forwards the new RREQ message by broadcasting via each of its interfaces (step 485). In one embodiment, further broadcasting of the RREQ message is only performed if the intermediate node has an active route to the RREQ message destination.

Referring again to FIG. 3, when node 1 begins a route discovery process to node 4, it sends out 2 RREQ broadcast packets with identifier (1.a, n) and (1.b, n) where n is the sequence number. Node 2 receives the RREQ with identifier (1.a, n) on its interface 2.a and in turn broadcasts it on both its interfaces. Node 2 does not receive the RREQ with identifier (1.b, n) from node 1 since it does not have an interface tuned to channel 6 (note 2 will get the RREQ list identifier (1.b,n) on channel 1 from node 5). Similarly node 3 receives the same RREQ in channel 11 through its interface 3.b., and node 4 on channel 6 on its interface 4.a.

When the destination-only flag is set in the RREQ message, only the destination is allowed to generate a Route Reply (RREP) message. If the destination-only flag is not set in the RREQ, an intermediate node is allowed to send an RREP if it has an active route toward the destination.

Referring again to FIG. 4, the RREP message is unicast (step 490) toward the source along the reverse route built during the RREQ propagation (step 493). As the RREP is propagated, the intermediate nodes build a forward route to the destination node (step 492). The RREP packet is also overloaded like the RREQ packet to carry the link information, and is appended as it traverses toward the actual source node (step 492). When the source node receives the RREP packet, it builds the route to the destination and sends out the queued data packets. When an active route breaks (step 494), the node in the route that detects the break either sends an Route Error (RRER) message toward the source node or, optionally, performs a local repair by finding an alternative path to the destination.

Figure 5:
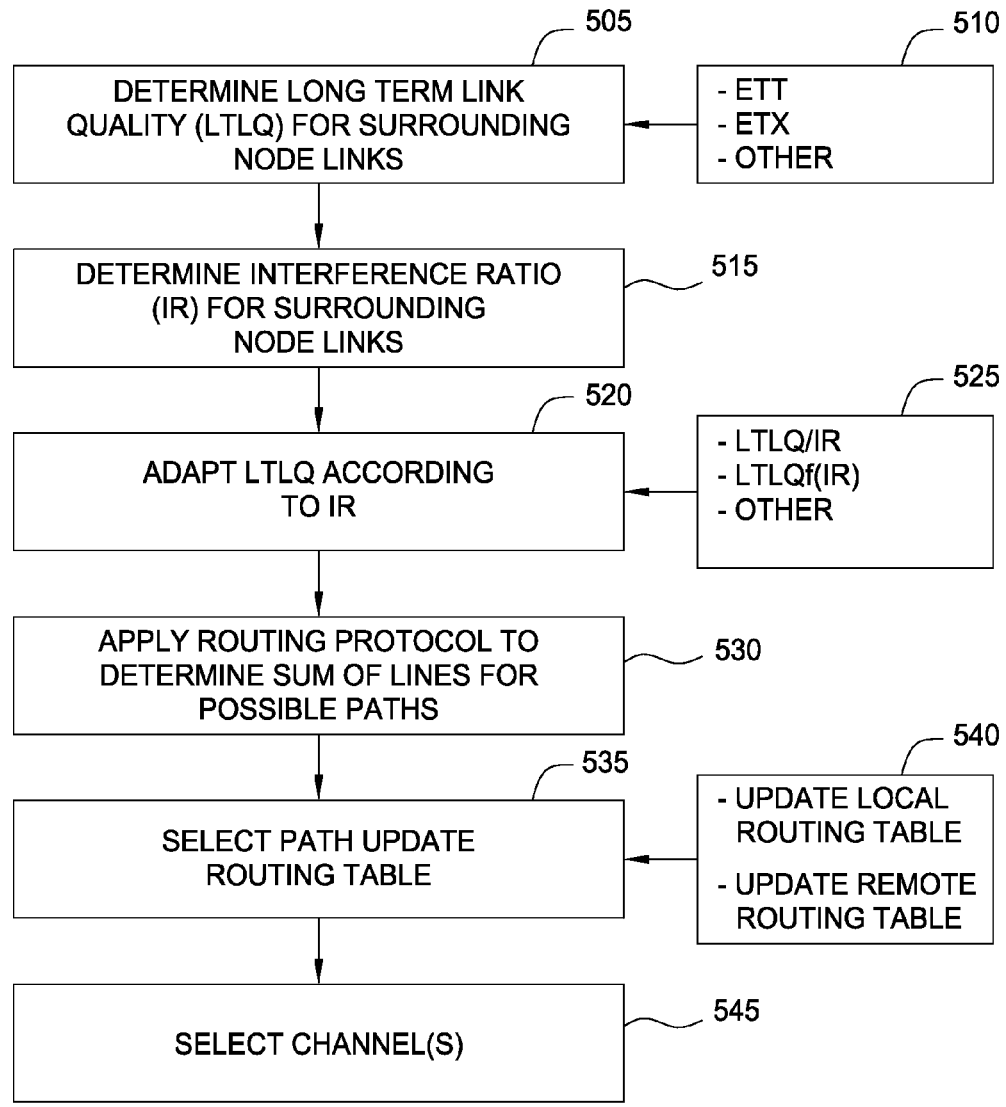
FIG. 5 depicts a flow diagram of link characterization and routing methods according to an embodiment of the invention.

FIG. 5 depicts a flow diagram of link characterization and routing methods according to an embodiment of the invention. Specifically, the method 500 provides a mechanism for improving the routing of packets at one or more nodes within a wireless mesh network, such as depicted above with respect to FIGS. 1 and 2. The method 500 may be executed within a single node, within a plurality of nodes and/or within a network management system (NMS).

The method 500 is entered at step 505, where one or more long-term link quality (LTLQ) metrics are determined for links associated with one or more nodes in a wireless mesh network. These links may comprise the links connecting one node to its surrounding nodes, the links forming one or more possible paths for data routing, the links within a particular region (e.g., a geographic or service-provider delineated region), the links associated with each of a plurality of radio channels (i.e., supporting multiple planes of the mesh network), and/or the entirety or other subset of links within the wireless mesh network. Thus, the relevant links for purposes of LTLQ determination at step 505 range from those links proximate a single network node to all of the links within the network.

Referring to box 510, the LTLQ metrics for the relevant links comprise ETT, ETX and/or other relatively long-term or slowly derived metrics. These LTLQ metrics may be derived, calculated and/or received as part of monitoring signal associated with the various links or the management systems supporting those links.

At step 515, and interference ratio (IR) is calculated for the step 505 relevant links having LTLQ metrics. In one embodiment of the invention of the IR is calculated as described above with respect to equation 5.

At step 520, the LTLQ metrics for the relevant links are adapted by the corresponding IR values. Referring to box 525, this step of adapting comprises scaling (e.g., dividing) each LTLQ metric by its corresponding IR value. More generally, the LTLQ metric multiplied by a function of the IR value denoted as f(IR). For scaling, the function may simply be 1/IR. Other simple or complex functions may be used, such as different or more aggressive scaling, piecewise scaling (different scaling for different ranges of IR), scaling with or without offset values, adaptive scaling depending on other factors, using different normalization routines and so on.

At step 530, a routing protocol is supplied to determine a sum of links for possible data routing paths. That is, each possible data routing path has associated with it one or more links. Each link has associated with it at least one IR-adapted LTLQ parameter. A total path quality parameter for each possible data routing path is determined by summing the IR-adapted LTLQ parameters of all the links forming the path.

At step 535, a routing path is selected, and a routing table is correspondingly updated. Referring to box 540, the of data routing table may comprise a local routing table (i.e., stored in a local network node or manager) or a remote routing table (i.e., stored in a remote network node or manager). That is, at step 535 the total path quality parameters for each of the possible data routing paths are compared to determine the "best" path for routing purposes. For example, referring to FIG. 2, in routing data from the first node to the second node, two paths are available; namely, paths 1-2 and path 1-3-4-2. A selection of one of these paths is made by comparing the respective of the IR-adapted LTLQ parameters for the links forming each path to determine the "best" path.

At step 545, the appropriate channel(s) are selected to enable data propagation via the appropriate path. Within the context of a multiple radio mesh network, it is desirable to transmit data on frequencies that are less likely to interfere with neighboring nodes. Thus, where dated to be routed a rise at a node on a first radio frequency (e.g., from a neighboring node), that data when routed will likely be transmitted on a different radio frequency.

Figure 6:
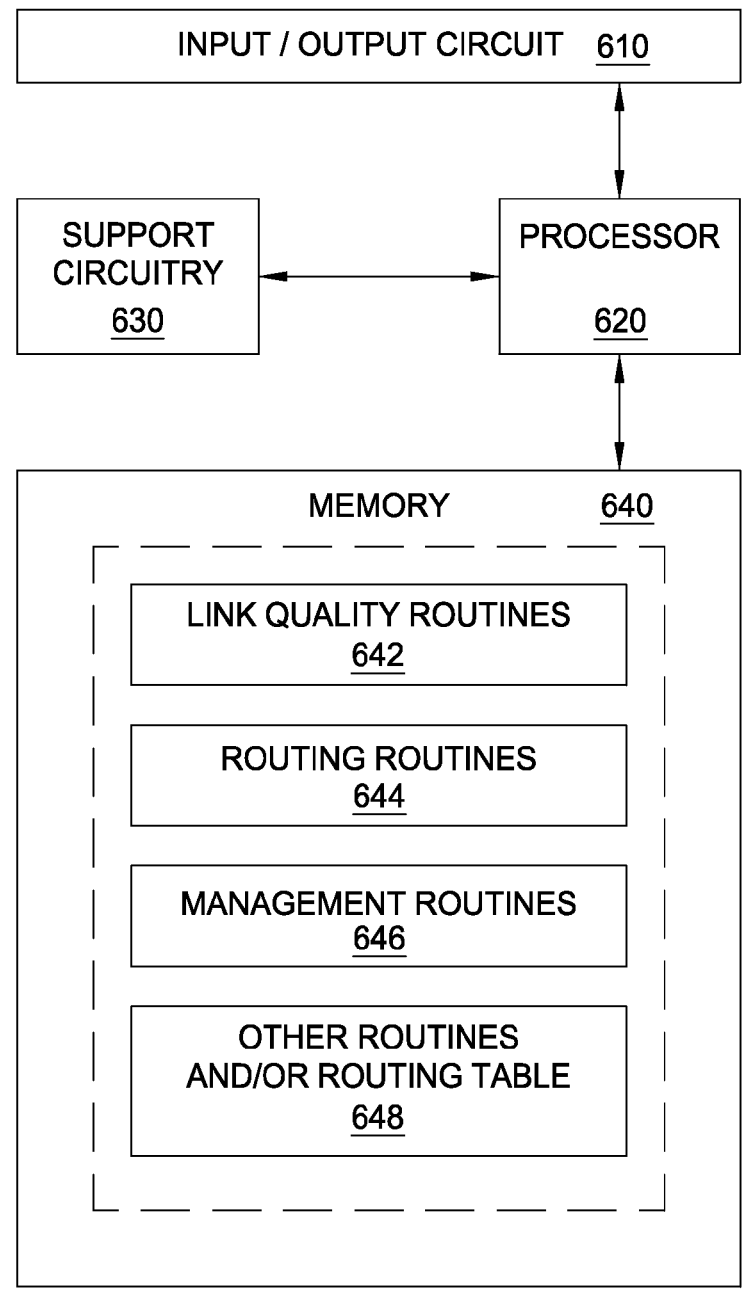
FIG. 6 depicts an processing architecture according to an embodiment of the present invention.

FIG. 6 depicts a processing architecture useful in implementing various embodiments of the present invention. Specifically, the processing architecture 600 of FIG. 6 may be used, for example, at a central or remote processing center such as a network element or network manager to process data streams and determine if they include key words or terms. Generally speaking, any of the methodologies discussed herein with respect to the present invention may be implemented using computer apparatus/architecture such as described herein with respect to FIG. 6. The apparatus/architecture of FIG. 6 is presented as a general purpose computing element adapted to perform the various stream and/or data processing tasks described herein. Moreover, while not discussed in detail herein, appropriate systems and apparatus for practicing the data structures, methodology and other aspects of the invention may be found in any system benefiting from the data processing and other techniques described herein.

FIG. 6 depicts a processing architecture 600 including a processor 620 as well as memory 640 for storing various control programs and other programs as well as data. The memory 640 may also store an operating system supporting the various programs.

The processor 620 cooperates with conventional support circuitry 630 such as power supplies, clock circuits, cache memory and the like as well as circuits that assist in executing the software routine stored in the memory 640. As such, it is contemplated that some of the steps discussed herein as software processes may be implemented within hardware, for example as circuitry that cooperates with the processor 620 to perform various steps. The processing architecture 600 also contains input/output (I/O) circuitry 610 which forms an interface between the various functional elements communicating with the architecture 600.

The architecture 600 may be advantageously employed within the context of a network management system (NMS), an element management system (EMS), network element, node or any other computing device used within, for example, a wireless mesh network such as described herein. More specifically, the architecture 600 may be utilized to perform various determinations, calculations and/or management functions such as discussed above with respect to various figures.

One embodiment of the invention comprises a system including an input/output circuit adapted to receive data streams; a memory, for storing computer instructions for a method of processing the received data stream; and a processor, for executing the computer instructions. While executing the computer instructions the processor operates to determining, for each of a plurality of links supporting any of a plurality of data transmission paths, a long term link quality (LTLQ) parameter; determining, for each of said plurality of links, an interference ratio (IR) parameter associated with any respective proximate links; adapting the LTLQ parameter of each of said plurality of links according to the respective IR parameter to determine thereby a link quality parameter; and routing data according to said link quality parameter.

The invention may be implemented as a computer program product wherein computer instructions, when processed by a computer, adapt the operation of the computer such that the methods, data structures and/or techniques of the present invention are invoked or otherwise provided. Instructions for invoking the inventive methods may be stored in fixed or removable media, transmitted via a data stream in a broadcast media, and/or stored within a working memory within a computing device operating according to the instructions.

Memory 640 is depicted as including, in one embodiment, link quality routines 642, routing routines 644, management routines 646 and other routines 648. Various routines and related methodologies are discussed herein.

It will be appreciated by those skilled in the art and informed by the teachings of the present invention that while the memory 640 includes a plurality of data structures, algorithms and storage regions, there is no requirement within the context of the present invention that a single memory device as depicted be utilized within the context of the update-stream processing architecture. Specifically, any combination of internal, external and/or associated memory may be utilized to store the software instructions necessary to provide the various functions. Thus, while the architecture depicts the memory as an integral portion of a relatively unified structure, the memory 640 may in fact be distributed internal or external to the update-stream processing architecture 600.

While the foregoing is directed to various embodiments of the present invention, other and further embodiments of the invention may be devised without departing from the basic scope thereof. As such, the appropriate scope of the invention is to be determined according to the claims, which follow.

What is claimed is:

1. A method adapted for use in a node of a wireless mesh network comprising a plurality of nodes, the method comprising:
    determining, for each of a plurality of links supporting any of a plurality of data transmission paths, a long term link quality (LTLQ) parameter;
    determining, for each of said plurality of links, an interference aware routing metric (iAWARE) parameter associated with any respective proximate links;
    adapting the LTLQ parameter of each of said plurality of links according to the respective iAWARE parameter to determine thereby a link quality parameter; and
    routing data according to said link quality parameter.

2. The method of claim 1, wherein said LTLQ parameter comprises an Expected Transmission Count (ETX) parameter.

3. The method of claim 1, wherein said LTLQ parameter comprises an Expected Transmission Time (ETT) parameter.

4. The method of claim 1, wherein said step of adapting comprises scaling said LTLQ parameter using said respective iAWARE parameter.

5. The method of claim 1, further comprising:
    determining, for each of said plurality of data paths, a sum of the quality parameters of the links forming the data path; and
    selecting the data path having a most favorable sum of quality parameters.

6. The method of claim 5, further comprising:
    updating a routing table according to the selected data path.

7. The method of claim 1, further comprising:
    selecting a least interfering channel for routing data to a next network node.

8. The method of claim 1, wherein said iAWARE parameter is calculated according to the following equation:

$$iWARE_j = \frac{ETT_j}{IR_j}$$

where
    $ETT_j$ is the Expected Transmission Time;
    $IR_j$ is the interference ratio for a node.

9. The method of claim 2, wherein said ETX parameter is determined using a forward delivery ratio d_f and a reverse delivery ratio d_r for each link, the forward delivery ratio d_f comprising a measured probability that a data packet successfully arrives at the recipient node, the reverse delivery ratio d_r comprising a measured probability that an ACK packet is successfully received from the recipient node.

10. The method of claim 2, wherein said ETT parameter is calculated according to the following equation:

$$ETT_i = ETX_i \times \frac{S}{B_i}$$

where S is the packet size used, and B, is the raw data rate of the link i, and $ETX_i$ is an expected MAC transmission time of a packet of size S over the link i.

11. The method of claim 1, wherein each node within the wireless mesh network determines the LTLQ parameter associated with its links to surrounding nodes.

12. The method of claim 11, wherein each nodes propagates to a network manager the LTLQ parameter associated with its links to surrounding nodes.

13. The method of claim 1, wherein the step of routing comprises using the said link quality parameter to route via any one of multiple available radio frequencies per link.

14. The method of claim 13, wherein an Ad-hoc On-demand Distance Vector (AODV) Multiple-Radio (AODV-MR) routing protocol is used to route data.

15. The method of claim 1, wherein link metrics for a path are captured during a route discovery process in which:
    each node propagates toward a destination node a route request (RREQ) message having appended thereto a corresponding channel identifier and link metric; and
    each node propagates a route reply (RREP) message toward a source node having appended thereto a corresponding channel identifier and link metric.

16. The method of claim 15, wherein link metrics within at least one of the RREQ and RREP messages are used to improve packet routing within a routing protocol.

17. The method of claim 16, wherein:
    each node propagates a route error (RERR) message toward a source node upon detecting a break in an active link.

18. The method of claim 16, wherein:
    each node performs a local repair of a broken active link.

19. A system, comprising:
    an input/output circuit adapted to receive data streams;
    a memory, for storing computer instructions for a method of processing the received data stream; and
    a processor, for executing the computer instructions;
wherein while executing the computer instructions the processor operates to perform a method comprising:
    determining, for each of a plurality of links supporting any of a plurality of data transmission paths, a long term link quality (LTLQ) parameter;
    determining, for each of said plurality of links, an interference aware routing metric (iAWARE) parameter associated with any respective proximate links;
    adapting the LTLQ parameter of each of said plurality of links according to the respective iAWARE parameter to determine thereby a link quality parameter; and
    routing data according to said link quality parameter.

20. A computer program product stored on non-transitory readable medium wherein computer instructions, when processed by a computer, adapt the operation of the computer to perform a method of routing data in a wireless mesh network, the method comprising:
- determining, for each of a plurality of links supporting any of a plurality of data transmission paths, a long term link quality (LTLQ) parameter;
- determining, for each of said plurality of links, an interference aware routing metric (iAWARE) parameter associated with any respective proximate links;
- adapting the LTLQ parameter of each of said plurality of links according to the respective iAWARE parameter to determine thereby a link quality parameter; and
- routing data according to said link quality parameter.

21. Apparatus for routing data in a wireless mesh network, comprising:
- means for determining, for each of a plurality of links supporting any of a plurality of data transmission paths, a long term link quality (LTLQ) parameter;
- means for determining, for each of said plurality of links, an interference aware routing metric (iAWARE) parameter associated with any respective proximate links;
- means for adapting the LTLQ parameter of each of said plurality of links according to the respective iAWARE parameter to determine thereby a link quality parameter; and
- means for routing data according to said link quality parameter.

* * * * *